United States Patent [19]
Pardikar

[11] Patent Number: 5,721,916
[45] Date of Patent: Feb. 24, 1998

[54] METHOD AND SYSTEM FOR SHADOWING FILE SYSTEM STRUCTURES FROM MULTIPLE TYPES OF NETWORKS

[75] Inventor: Shishir Pardikar, Redmond, Wash.

[73] Assignee: Microsoft Corporation, Redmond, Wash.

[21] Appl. No.: 832,313

[22] Filed: Feb. 26, 1997

Related U.S. Application Data

[63] Continuation of Ser. No. 342,127, Nov. 18, 1994, abandoned.

[51] Int. Cl.$^6$ .................................................. G06F 15/163
[52] U.S. Cl. ..................... 395/617; 395/608; 395/610; 395/618; 395/620; 395/200.03; 395/200.08; 395/200.09
[58] Field of Search .................................. 395/617, 618, 395/619, 620, 608, 610, 200.03, 200.08, 200.09

[56] References Cited

U.S. PATENT DOCUMENTS

| | | | |
|---|---|---|---|
| 4,814,971 | 3/1989 | Thatte | 364/200 |
| 4,823,310 | 4/1989 | Grand | 364/900 |
| 5,212,788 | 5/1993 | Lomet et al. | 395/600 |
| 5,241,673 | 8/1993 | Schelvis | 395/600 |
| 5,263,155 | 11/1993 | Wang | 395/600 |
| 5,367,698 | 11/1994 | Webber et al. | 395/800 |
| 5,418,713 | 5/1995 | Allen | 364/403 |
| 5,418,945 | 5/1995 | Carter et al. | 395/600 |
| 5,452,454 | 9/1995 | Basu | 395/700 |
| 5,475,819 | 12/1995 | Miller et al. | 395/200.03 |
| 5,493,728 | 2/1996 | Solton et al. | 395/250 |
| 5,628,005 | 5/1997 | Hurvig | 395/608 |

OTHER PUBLICATIONS

Kistler, James J. and M. Satyanarayanan, "Disconnected Operation in a Coda File System," ACM Transactions on Computer Systems, vol. 10(1), Feb. 1992, pp. 3–25.

Rao, Herman C., and Larry L. Peterson, "Accessing Files in an Internet: The Jade File System," IEEE Transactions on Software Engineering, vol. 19(6), Jun. 1993, pp. 613–624.

Satyanarayanan, Mahadev, "Scalable, Secure, and Highly Available Distributed File Access," Computer, vol. 23(5), May 1990, pp. 9–18 and 20–21.

Nelson, Michael N., and Yousef A. Khalidi, "Generic Support for Caching and Disconnected Operation," Workshop on Workstation Operating Systems, Oct. 14–15, 1993, Napa, California, pp. 61–65.

Satyanarayanan, Mahadev et al., "Coda: A Highly Available File System for a Distributed Workstation Environment," IEEE Transactions on Computers, vol. 39(4); pp. 447–459; Apr., 1990.

*Primary Examiner*—Thomas G. Black
*Assistant Examiner*—Jean R. Homere
*Attorney, Agent, or Firm*—Seed and Berry LLP

[57] ABSTRACT

A method and system for showing file system structures on a computer system that can be connected to multiple types of networks. The file shadowing mechanism automatically and transparently stores shadow copies of remote file system structures when they are accessed by a computer. The shadow copies of the file system structures are stored within a shadow database that resides within local memory of the computer. When the computer becomes disconnected from a network, shadow copies of file system structures for the network are used to service requests to access such file system structures.

16 Claims, 9 Drawing Sheets

METHOD AND SYSTEM FOR SHADOWING FILE SYSTEM STRUCTURES FROM MULTIPLE TYPES OF NETWORKS

CROSS-REFERENCE TO RELATED APPLICATION

This application is a file wrapper continuation of U.S. patent application Ser. No. 08/342,127, filed Nov. 18, 1994, now abandoned.

TECHNICAL FIELD

The present invention relates generally to data processing systems and, more particularly, to shadowing files from multiple types of networks.

BACKGROUND OF THE INVENTION

One difficulty encountered with portable computers concerns accessing files when disconnected from a network. Most portable computers provide facilities for the portable computer to be connected to a network. When the portable computer is connected to the network it may gain access to remote files that are stored within the network. Unfortunately, when the portable computer becomes disconnected from the network, the portable computer no longer has access to the remote files stored in the network.

SUMMARY OF THE INVENTION

In accordance with a first aspect of the present invention, a method of providing access to a file system structure from a network when a computer is disconnected from the network is provided. The method is practiced in a data processing system that includes a computer with a storage device. The computer is connectable to a first network of a first type and a second network of a second type. In this method, when the computer is connected to a select of one of the networks and a program is running on the computer, several steps are performed. First, a request to access one of the selected file system structures stored in the selected network is received from the program. In response to this request, a shadow copy of the selected file system structure is transparently obtained so that the shadow copies are obtained transparently relative to the program. The shadow copy of a selected file system structure is stored in a shadow database on the storage device. The shadow database holds file system structures for use when the computer is no longer connected to the selected network.

In accordance with another aspect of the present invention, a method is practiced in a data processing system that has a computer with a storage. The computer is connectable to a plurality of networks of different types. At least one of the networks stores a selected file system structure. In this method, a shadow database is provided in the storage for storing shadow copies of file system structures that are retrieved for the networks. The shadow database includes a shadow copy of the selected file system structure from the selected network. When the computer is disconnected from the selected network, a request to access the selected file system structure is received and the shadow copy of the selected file system structure that is stored in the shadow database is used to service the request.

In accordance with a further aspect of the present invention, a method is practiced in a data processing system having a computer with a storage and the computer is connectable to a plurality of networks of different types. Each network includes at least one file system structure. In this method, when the computer is connected to the network, requests to access file structures of the networks are received and shadow copies of the file system structures for which requests to access are received are stored in a shadow database in the storage. When the computer is disconnected from at least one of the networks and a request to access a selected file system structure in one of the disconnected networks is received, the shadow database is accessed to use a shadow copy of the selected file system structure to service the request.

In accordance with yet another aspect of the present invention, a computer system is connectable to different types of networks. The computer system includes a shadow database that holds shadow copies of selected file system structures from different types of networks. The computer system also includes a shadow module for responding to a request or access one of the selected file system structures by accessing the shadow database to obtain a shadow copy of the requested file system structure to service the request. The computer system may also include a shadow database builder for building the shadow database. The shadow database builder stores shadow copies of selected file system structures when the file system structures are accessed by the computer. The computer system also may include an agent for building and maintaining the shadow database.

DETAILED DESCRIPTION OF THE INVENTION

The preferred embodiment of the present invention provides network independent file shadowing. The file shadowing provided by the preferred embodiment is network independent in that files from different types of networks may be shadowed using the mechanism of the preferred embodiment of the present invention. The file shadowing performed by the preferred embodiment of the present invention automatically and transparently keeps copies of files that are accessed by a user in a remote network file system. The transparency provided by the preferred embodiment relieves the user of the burden of selecting which files to store locally for access when the computer is disconnected from the remote networks.

Figure 1:
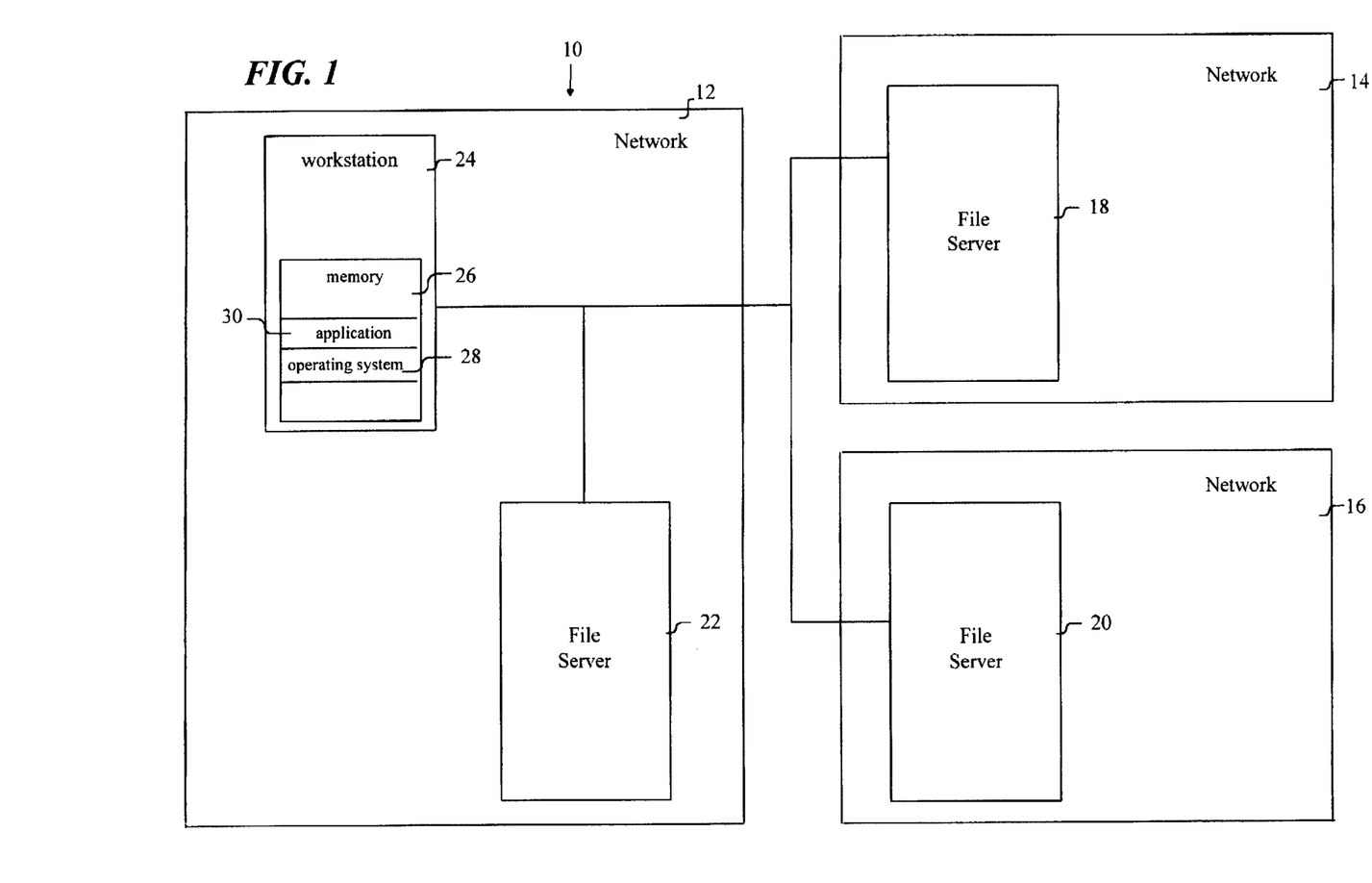
FIG. 1 is a block diagram of a distributed system that is suitable for practicing the preferred embodiment of the present invention.

FIG. 1 is a block diagram of an illustrative distributed system 10 that is suitable for practicing the preferred embodiment of the present invention. Those skilled in the art will appreciate that the distributed system depicted within FIG. 1 is intended to be merely illustrative and that the present invention may be practiced in other data processing system configurations. The distributed system 10 depicted in FIG. 1 includes networks 12, 14, and 16. Each of these networks includes a file server 18, 20 and 22, respectively. The file servers 18, 20 and 22 regulate access to files and other data stored within the respective networks 12, 14, and 16. Each of the networks 12, 14, and 16 may include additional components such as workstations, storage devices, and other peripheral devices. Network 12 includes a workstation 24 with memory 26. The memory 26 holds a copy of an operating system 28 and at least one application program 30. Code for practicing the preferred embodiment of the present invention is encapsulated within the operating system 28. Nevertheless, those skilled in the art will appreciate that in alternative embodiments this code may be encapsulated into separate modules that are not directly incorporated into the operating system.

For purposes of the discussion below, it is assumed that the workstation 24 may be decoupled from networks 14 and 16. Moreover, it is assumed that the workstation 24 is a portable computer that is readily adaptable for use in an isolated environment. Those skilled in the art will appreciate that the present invention is not limited to practice on a portable computer, but rather may also be practiced on other types of computer systems.

The preferred embodiment of the present invention overcomes the difficulties of the prior art described within the Background section by automatically and transparently storing shadow copies of files that are accessed by the workstation 24 from remote networks (like networks 14 and 16). As will be described in more detail below, the preferred embodiment of the present invention provides a file shadowing mechanism and a database of remotely accessed files that serve as a persistent cache. The file shadowing mechanism hooks requests for file input/output (I/O) from the remote networks. The files involved in such requests are then brought into the persistent cache. Thus, while workstation 24 is connected to networks 14 and 16, a persistent cache is built so that the files within the persistent cache may later be accessed when the workstation is no longer connected to networks 14 and 16.

Figure 2:
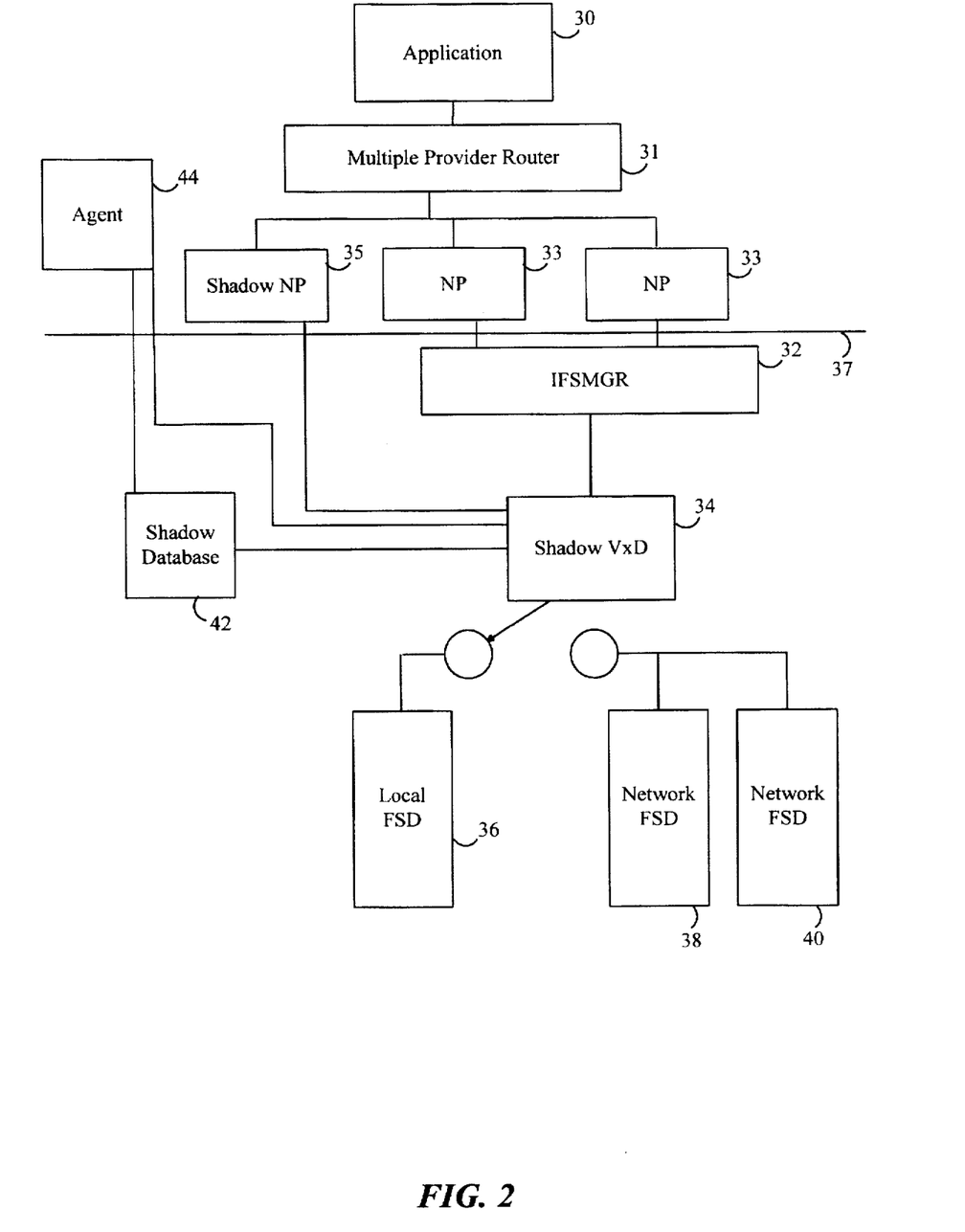
FIG. 2 is a block diagram illustrating the software components that play a role in practicing the preferred embodiment of the present invention.

FIG. 2 is a block diagram illustrating software components that play a role within the preferred embodiment of the present invention. Border 37 separates the software components at the user privilege level from software components at the kernel privilege level. The file I/O requests are generated by the application program 30. The application program 30 may be any type of application, including a word processing or spreadsheet program. Those skilled in the art will appreciate that the present invention also is applicable to instances wherein the file I/O requests are initiated from within the operating system 28, rather than from within an application program 30. For purposes of the discussion below, an application program is intended to include any program that can generate a file I/O request.

The request originating from the application program 30 is passed to a multiple provider router 31. The multiple provider router 31 routes the request to the network providers 33 and 35. The network providers 33 and 35 are provided as client code in the operating system 28. The network providers 33 and 35 include functions that allow a connection to be created between the application program 30 and a remote network. The multiple provider router 31 passes the requests to each of the network providers to determine which network provider can successfully connect with the appropriate network. Separate network providers 33 and 35 are provided for each of the different types of networks within the distributed system 10. The preferred embodiment of the present invention provides a shadow network provider which is used when none of the other network providers 33 succeed in establishing a connection. The shadow network provider 35 is used to establish a shadow network connection to the shadow database 42 so that the data contained therein may be accessed. The use of the shadow network provider 35 will be described in more detail below. The network providers 33 and 35 may establish a connection to a remote network by directly interacting with the file system drivers 38 and 40, which will be described in more detail below. Alternatively, the network providers 33 may establish connections to remote networks via the installable file system manager 32.

The IFSMGR 32 is included as part of the operating system 28 and is responsible for directing file I/O requests to their proper destination (i.e., to the proper file server for handling the request). The IFSMGR 32 is designed to work with multiple file systems so that a user may access files in different file system types.

The IFSMGR 32 interacts with file system drivers (FSDs), like FSDs 36, 38, and 40, which are shown in FIG. 2. The FSDs 36, 38, and 40 serve as interfaces between the IFSMGR 32 and the file systems. The FSDs appear to the system as device drivers. Specifically, the FSDs 36, 38, and 40 are viewed as device drivers that are responsible for a file system.

The FSDs 36, 38, and 40 are part of the operating system 28. The FSDs 36, 38, and 40 may interface with local file systems (like FSD 36) or remote file systems (like FSDs 38 and 40). Each of the FSDs 36, 38, and 40 is designed to interface with a given file system.

The shadow VxD 34 is a virtual device driver for monitoring file I/O requests to determine what files need to be placed within the persistent cache (known as the shadow database 42). The shadow VxD 34 is a virtual device driver that simulates a device (i.e., it represents the virtualization of a device). The shadow VxD 34 is implemented as part of the kernel of the operating system 28. The responsibilities of the shadow VxD 34 will be described in more detail below.

A user hints database may be provided to determine what file type should be included and excluded from the shadow database 42. The hints database acts like a filter to include or exclude certain file references. The hints database also acts like a work queue for the agent in that the agent may periodically fill in the requested file references in the hints database, regardless of whether the files have been referenced by any other application program. A hints database tries to maximize the utility of the local disk space in order to optimize the space that is available for the user when the user's computer is disconnected from a network.

The shadow database 42 holds complete naming information for files that are accessed by the workstation 28 (FIG. 1) and that are within a remote file system. The shadow database 42 also holds a representation of the file that is accessed (i.e., either a sparse representation or a complete representation of the file). The shadow database 42 also has a priority queue wherein higher priority files are at the head of the queue and lower priority files are at the end of the queue. Higher priority files are those which have a higher priority for remaining within the shadow database 42 than lower priority files.

An application, known as an agent 44, is provided to maintain the shadow database 42. As will be described in more detail below, the agent 44 is periodically awoken to bring files into the shadow database 42 and to update the shadow database as needed.

Figure 3:
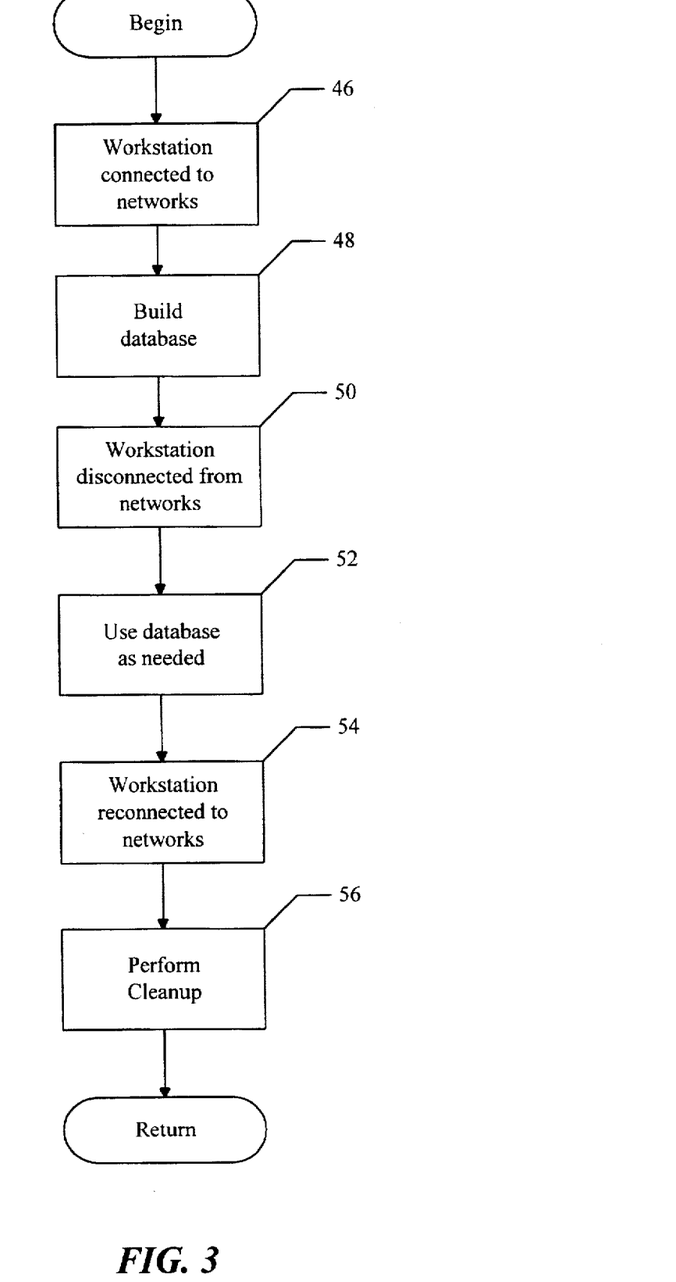
FIG. 3 is a flowchart providing an overview of the steps performed in the preferred embodiment of the present invention.

FIG. 3 is a flowchart showing an overview of the steps that are performed by the preferred embodiment of the present invention. Initially, a workstation 24 is connected to networks 14 and 16 (step 46 in FIG. 3). The shadow database 42 is then built as will be described in more detail below (step 48 in FIG. 3). Later, the workstation 24 becomes disconnected from one or more of the networks 14 and 16 (step 50 in FIG. 3). While the workstation 24 remains disconnected from the networks, the shadow database 42 is used as a persistent cache that is accessed to locate files that originated from remote file systems (step 52 in FIG. 3). The workstation 24 then reconnects to the networks (step 54 in FIG. 3) and various clean-up activities are performed (step 56).

Figure 4:
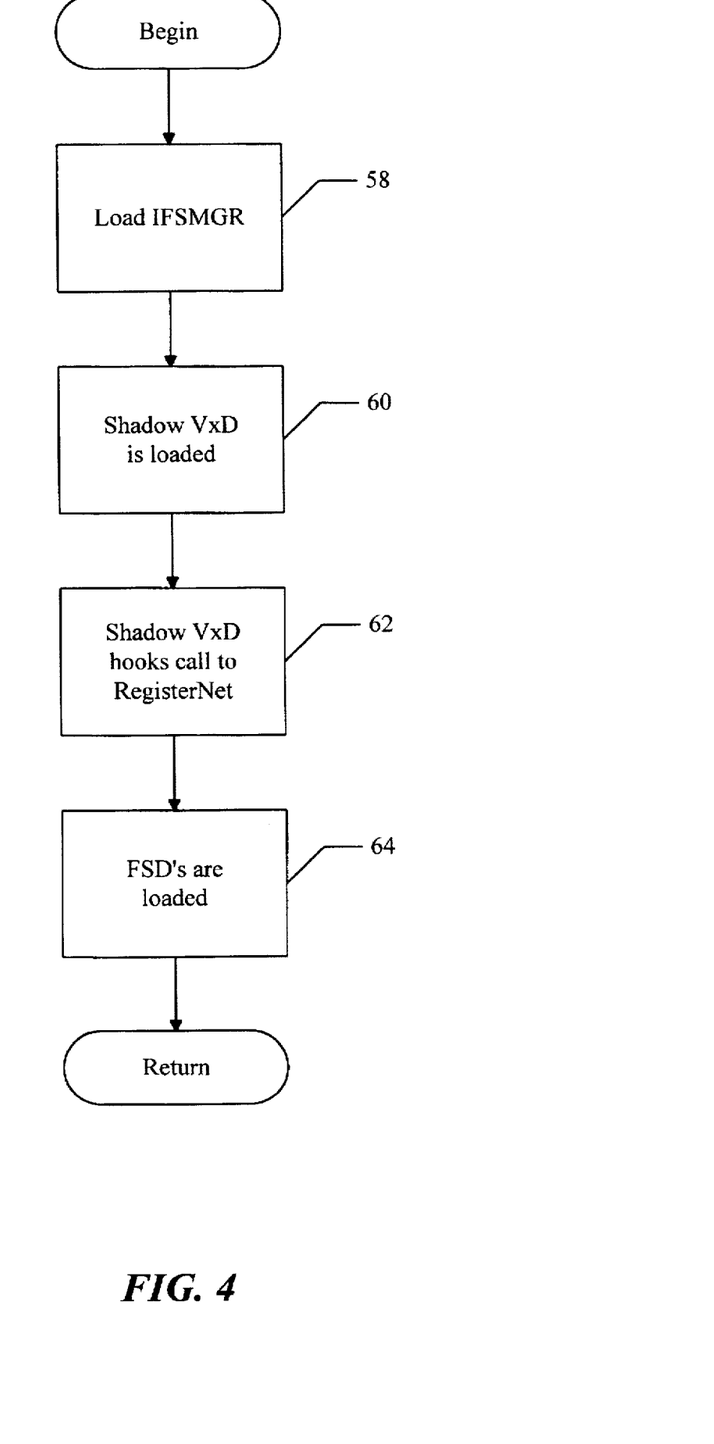
FIG. 4 is a flowchart illustrating the steps that are performed to have the shadow VxD hook file input/output requests in accordance with the preferred embodiment of the present invention.

The shadow VxD 34 is responsible for hooking the file I/O requests to remote file systems. FIG. 4 is a flowchart that illustrates the steps that are performed to enable the shadow VxD 34 to perform such hooking. Initially, during system boot, the IFSMGR 32 is loaded into memory 26 of the workstation 24 (step 58 in FIG. 4). Once the IFSMGR 32 is fully loaded, the shadow VxD 34 is loaded (step 60 in FIG. 4). The shadow VxD 34 hooks the calls to the RegisterNet service, which registers the remote file system drivers with the IFSMGR 32 (step 62 in FIG. 4). The remote file system drivers 38 and 40 are then loaded subsequently (step 64 in FIG. 4). The RegisterNet service registers remote networks with the IFSMGR 32. By hooking this call to the Register-Net service, the shadow VxD 34 can hook each file I/O request that is sent from the IFSMGR 32 to one of the remote file system drivers 38 and 40.

When each of the file system drivers 38 and 40 are loaded, they call the RegisterNet service that is provided by the IFSMGR 32 to register the FSDs. The FSDs 38 and 40 forward a function pointer to make a connection to the file system driver as part of a call to the RegisterNet service. Subsequently, when the IFSMGR 32 needs a connection to be made, it calls the function that is identified by the pointer that is passed from the FSD 38 or 40. When this function call succeeds, the FSD returns an array of function pointers to the IFSMGR 32. This array of function pointers points to functions that can be performed on the file system associated with the FSD 38 or 40. The shadow VxD 34 hooks the RegisterNet call from the FSD 38 and 40 and receives the array of function pointers. The shadow VxD 34 passes its own array of function pointers to the IFSMGR 32. The array of function pointers passed to the IFSMGR from the shadow VxD 34 provide hooks into functions of the shadow VxD 34. As a result, each time that an operation is to be performed on one of the remote file systems, the shadow VxD 34 hooks these calls and fills the shadow database 42 accordingly.

Figure 5:
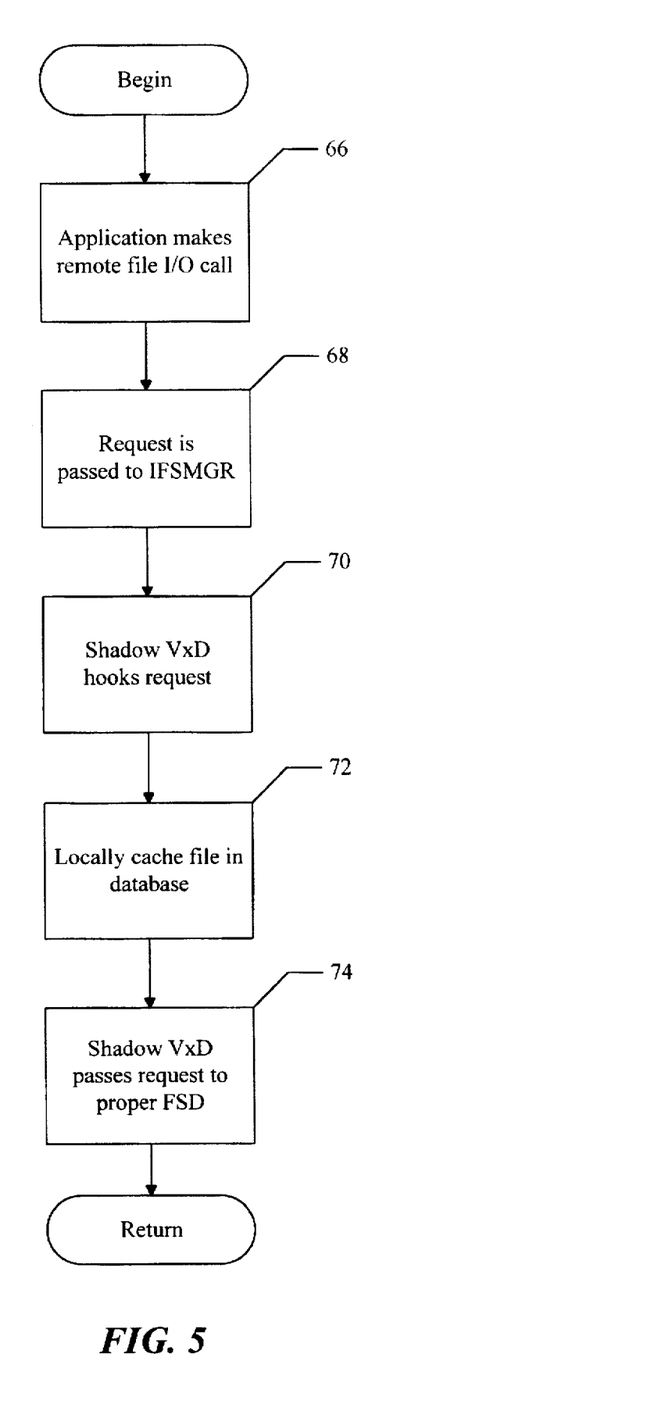
FIG. 5 is a flowchart illustrating the steps that are performed when a file I/O request is made for a remote file in accordance with the preferred embodiment of the present invention.

FIG. 5 is a flowchart illustrating the steps that are performed by the preferred embodiment of the present invention when an I/O request originates from application program 30. The process is initiated by the application program 30 making a file I/O request to a file that resides in one of the remote networks (step 66 in FIG. 5). As was discussed above, this remote file I/O request may originate from any program that is running on the local workstation 24. The request is passed to the IFSMGR 32 (step 68 in FIG. 5). The shadow VxD 34 hooks the request (step 70 in FIG. 5) and adds the file to the shadow database 42 if it is not already present within the shadow database (step 70 in FIG. 5). In particular, complete naming information for the requested file is stored within the shadow database 42. This complete naming information includes a pathname for the server-share pair as specified according to the unified naming convention (UNC). The files are stored within the database 42 in a sparse format (i.e., the contents of the file are not stored immediately therein). The shadow VxD 32 then passes the file I/O request to the proper FSD so that the appropriate file is retrieved (step 74).

Figure 6:
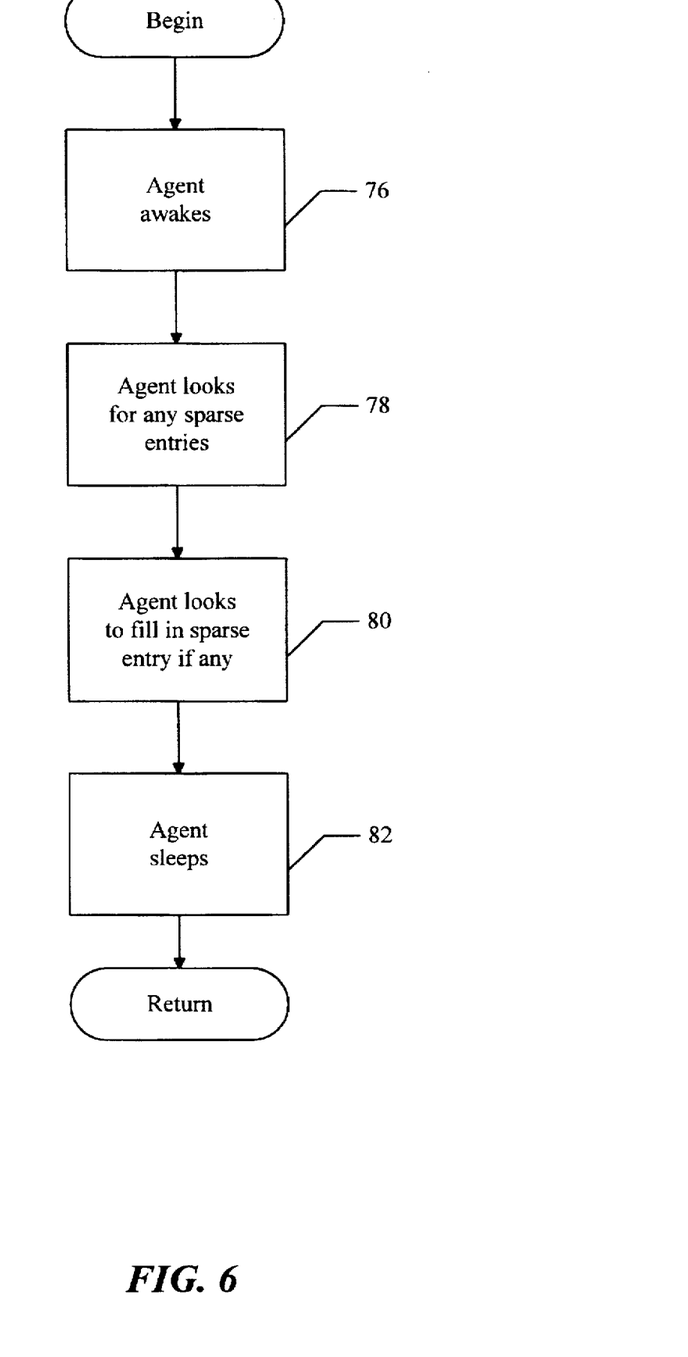
FIG. 6 is a flowchart illustrating steps that are performed by the shadow database in accordance with the preferred embodiment of the present invention.

As was mentioned above, the role of the agent 44 (FIG. 2) is to maintain the shadow database 42. One of the primary roles of the agent 44 is to retrieve the contents of files that are stored sparsely within the shadow database 42. The agent 44 performs this task as a background thread. FIG. 6 is a flowchart illustrating the steps that are performed by the agent 44 in this capacity. Initially, the agent 44 is awoken on a periodic basis (step 76 in FIG. 6). For example, the agent 44 may be awoken every 30 seconds. It is then active and subsequently put back to sleep. When the agent is awoken it looks at the entries within the shadow database 42 and identifies entries that are stored in sparse form (step 78 in FIG. 6). The agent 44 begins looking for sparse entries at the top of the priority queue and then proceeds down to lower priority entries. When the agent 44 locates a sparsely stored entry, the agent attempts to fill in the contents of the file by grabbing a shadow copy of the file (step 80). The agent 44 is then put back to sleep after the fixed period of time elapses or after the agent has nothing further to do (step 82).

Figure 7:
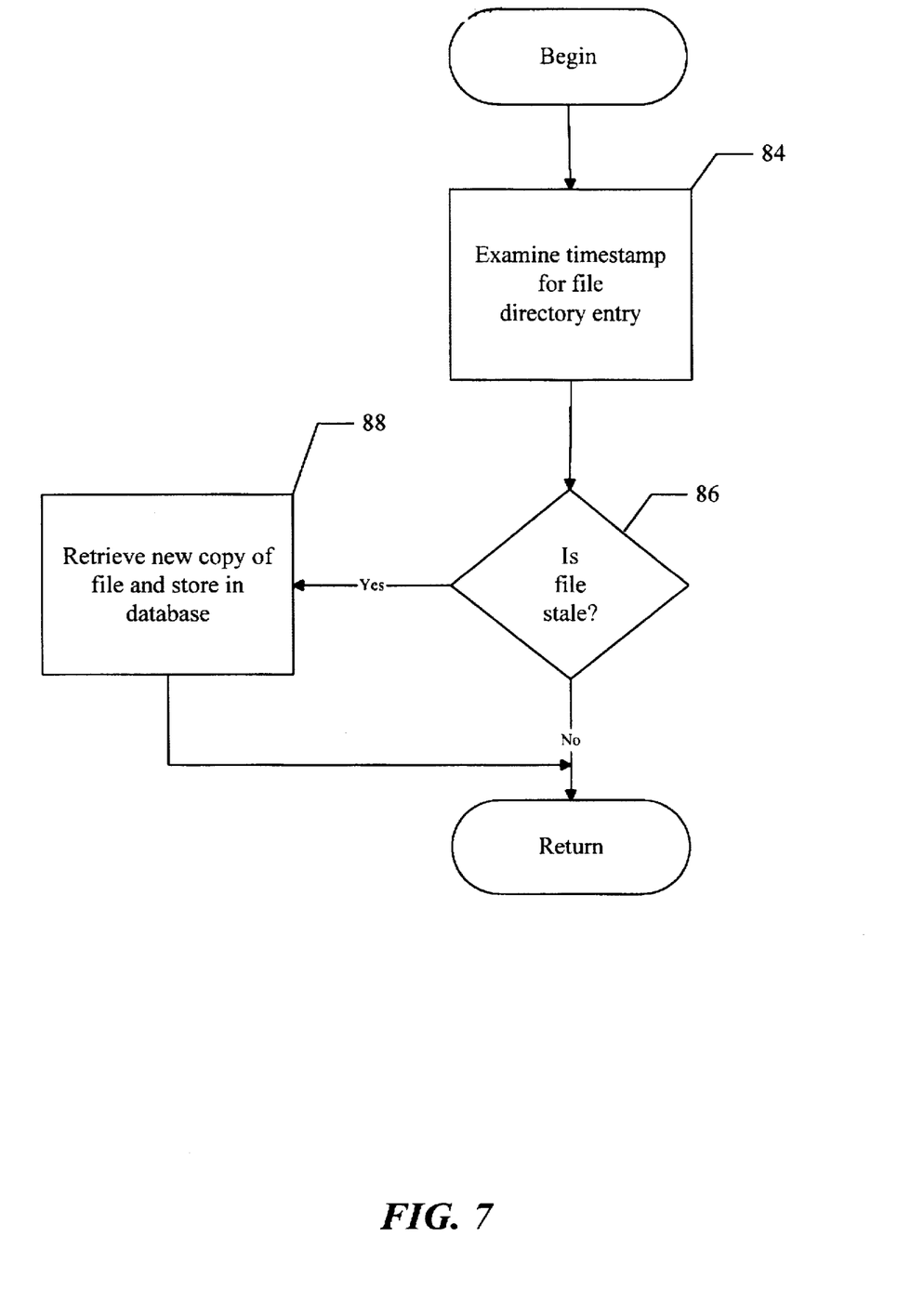
FIG. 7 is a flowchart illustrating the steps that are performed by the agent to remove stale entries in the shadow database in the preferred embodiment of the present invention.

The agent 44 is also responsible for maintaining the shadow database 42. One difficulty is that copies of files stored within the shadow database 42 may become stale or too old. Each time a file is retrieved and stored within the shadow database 42, a timestamp is entered in the database. This timestamp is used as shown in FIG. 7 to remove stale entries from the shadow database 42. In particular, the agent 44 examines the timestamp for files stored within the shadow database 42 (step 84 in FIG. 7). The shadow VxD may perform this examination on opening of the files in the shadow database or at other suitable times. The timestamp is compared to a predetermined timestamp value to determine if the file is stale or not (step 86). Any timestamps with values earlier than the cutoff timestamp value are targeted for removal. If a file is determined to be stale, a new copy of the file is retrieved and stored within the shadow database 42 (step 88 in FIG. 7).

Figure 8:
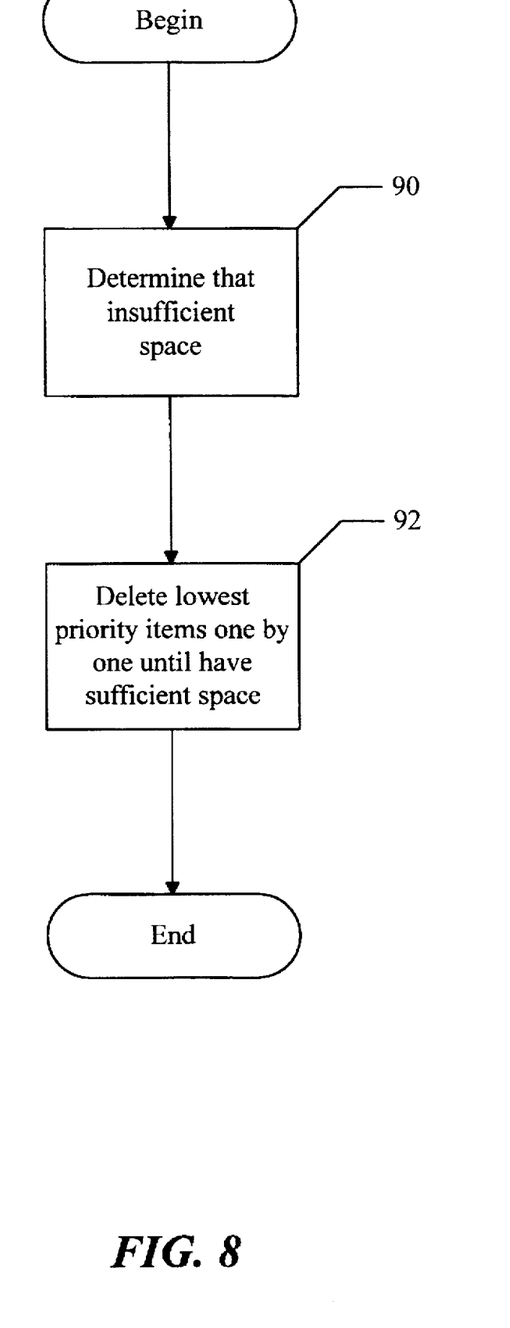
FIG. 8 is a flowchart illustrating the steps performed by the agent to create sufficient free space in the shadow database in accordance with the preferred embodiment of the present invention.

Another difficulty that the agent 44 must address in maintaining the shadow database 42 is that the size of the shadow database 42 is fixed and hence, may become full. For example, the shadow database 42 may constitute a fixed size portion of a hard disk drive for the workstation 24. As more files are brought into the shadow database, there is an increasing likelihood that the shadow database 42 will become full. In such an instance, certain files must be removed from the shadow database. As shown in FIG. 8, the agent 44 determines that insufficient space is available (step 90 in FIG. 8). This determination may be made upon writing to the shadow database 42, upon each opening of a file in the shadow database, or at other alternative times. The agent 44 begins deleting the lowest priority files on a one-by-one basis until sufficient space in the shadow database 42 is available (step 92 in FIG. 8).

Figure 9:
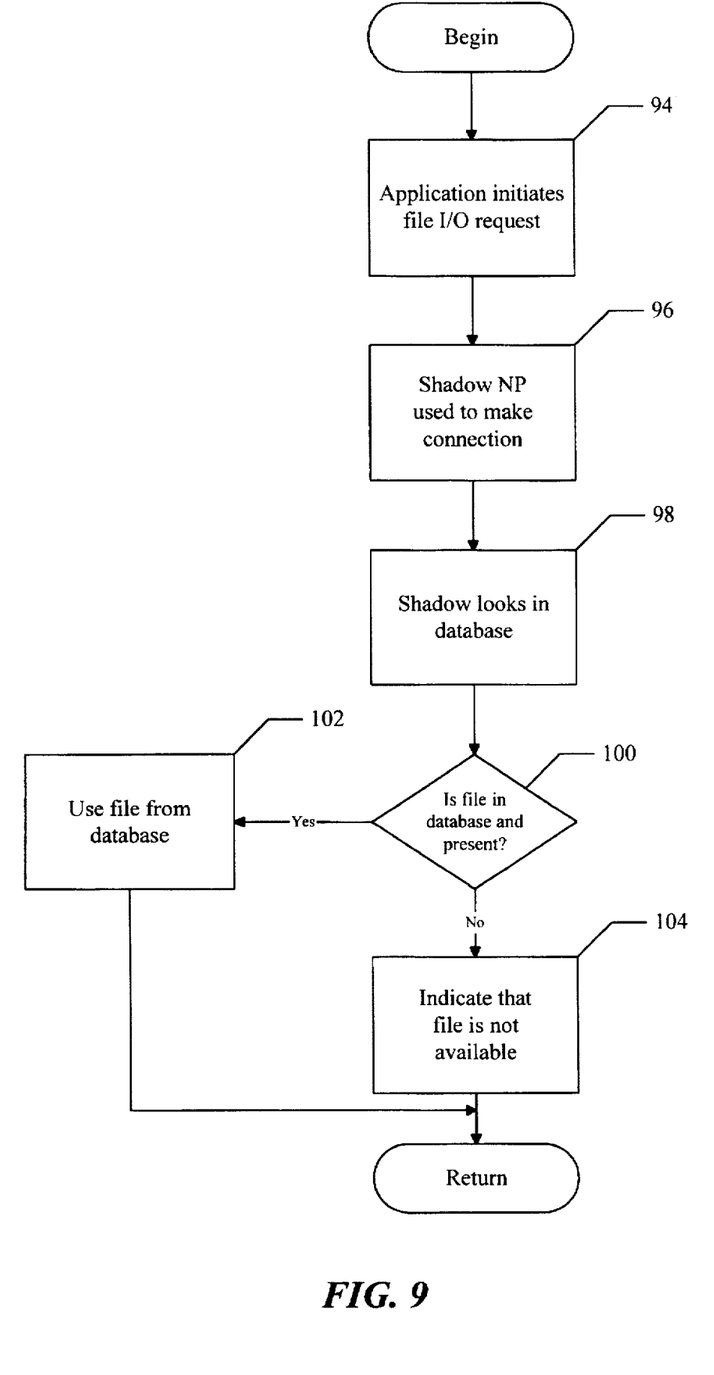
FIG. 9 is a flowchart illustrating the steps that are performed to use the shadow database when a computer is disconnected from a network in accordance with the preferred embodiment of the present invention.

As was discussed above, the shadow database 42 is built while the workstation 24 is connected to the networks 16 and 18. The shadow database 42 is used, however, primarily when the workstation 24 is disconnected from one or more of the networks 16 and 18. FIG. 9 is a flowchart illustrating the steps that are performed to use the shadow database 42 when the workstation 24 is disconnected from one or more of the networks 16 and 18. The application program 30 is running on the workstation 24 and initiates a file I/O request for a file on a remote file system (step 94 in FIG. 9). The multiple provider router 31 determines that the conventional network providers 33 cannot be used to realize a connection to the network that holds the file in the remote file system and, thus, routes the request to the shadow network provider 35, which calls the shadow VxD 34 to access the shadow database 42 (step 96 in FIG. 9). The shadow VxD 34 then becomes active and looks within the shadow database 42 (step 98 in FIG. 9). The shadow VxD 34 checks whether the file is in the shadow database 42 and present (i.e., not in sparse form) (step 100 in FIG. 9). If the file is stored within the shadow database 42, it is retrieved and used (step 102 in FIG. 9). On the other hand, if the file is not within the database or is merely stored in sparse form, an error indicating that the file is not available is returned (step 104).

When the workstation 24 is reconnected with one or more of the networks 14 and 16, a file server 18 and 20 of the network must examine the local copies of files held at the workstation 24 and reconcile these copies with those held in the network. Standard reconciliation techniques may be utilized. The agent 44 may include code for checking whether a given file server is online or not. When the server is online and local files have been modified, the integration and reconciliation is triggered.

While the present invention has been described with reference to a preferred embodiment thereof, those skilled in the art will appreciate that various changes in form and detail may be made without departing from the intended scope of the present invention as defined in the appended claims.

I claim:

1. In a data processing system having a computer with a storage device and that is connectable without rebooting to a first network of a first type and a second network of a second type, wherein the first network and the second network each store file system structures, a method of providing access to one of the file system structures from one of the networks when the computer is disconnected from at least one of the networks, comprising the steps of:

when the computer is connected to the first network and a first program is running on the computer,
(i) receiving a first request to access a selected one of the file system structures stored on the first network from the first program;
(ii) in response to the first request, transparently obtaining a shadow copy of the selected file system structure relative to the first program;
(iii) storing the shadow copy of the selected file system structure in a shadow database on the storage device which holds file system structures connected to the first network;

when the computer is subsequently connected to the second network and a second program is running on the computer, (i) receiving a second request to access a given one of the file system structures stored on the second network from the second program;
(ii) in response to the second request, transparently obtaining a shadow copy of the given file system structure relative to the second program; and
(iii) storing the shadow copy of the given file system structure in the shadow database on the storage device.

2. The method of claim 1, further comprising the steps of: when the computer is disconnected from the first network,
(i) receiving a request to access the selected file system structure of the first network; and
(ii) using the shadow copy of the selected file system structure that is stored in the shadow database to service the request.

3. The method of claim 2, further comprising the step of flushing the shadow database to remove all file system structures for the first network when the computer is reconnected to the first network.

4. The method of claim 1, further comprising the steps of:
before storing the shadow copy of the selected file system structure, determining that there is insufficient free space in the shadow database to store the shadow copy; and
deleting file system structures in the shadow database to create sufficient free space to store the shadow copy of the selected file system structure.

5. The method of claim 1 wherein the shadow database is a priority queue that stores file system structures according to priority of the file system structures and wherein the selected file system structure has a priority and said step of storing the shadow copy of the selected file system structure comprises the step of storing the shadow copy of the selected file system structure at a location in the priority queue based on the priority of the selected file system structure.

6. In a computer system having a computer with a storage device, wherein said computer is connectable to both a first network of a first type and a second network of a second type and both the networks store file system structures, a method comprising the computer implemented steps of:
providing a shadow database for storing shadow copies of the file system structures stored on the networks;
providing a shadow virtual device driver;
with the virtual device driver, transparently hooking an input/output request that entails access to a selected one of the file system structures on a selected one of the networks from the program running on the computer;
with the virtual device driver, transparently obtaining a copy of the selected file system structure in the shadow database;
when the computer is disconnected from the selected network, accessing the copy of the selected file system structure that is stored in the shadow database to service an input/output request that entails access to the selected file system structure.

7. The method of claim 6 wherein the computer also includes a shadow database agent for maintaining the database such that stale file system structures are removed from the shadow database by the agent.

8. The method of claim 7 wherein the computer is multi-threaded and wherein the agent runs as a background thread.

9. The method of claim 7 wherein file system structures stored in the shadow database include timestamps and these timestamps are examined to determine if a file system structure is stale.

10. The method of claim 6 wherein the computer includes client code for interfacing with the first network and client code for interfacing with the second network.

11. In a computer system having a computer with a storage device, wherein said computer is connectable to both a first network of a first type and a second network of a second type and both the networks store file system structures, a computer-readable medium holding computer-executable instructions for performing a method comprising the computer implemented steps of:

providing a shadow database for storing shadow copies of the file system structures stored on the networks;

providing a shadow virtual device driver;

with the virtual device driver, transparently hooking an input/output request that entails access to a selected one of the file system structures on a selected one of the networks from the program running on the computer;

with the virtual device driver, transparently obtaining a copy of the selected file system structure in the shadow database;

when the computer is disconnected from the selected network, accessing the copy of the selected file system structure that is stored in the shadow database to service an input/output request that entails access to the selected file system structure.

12. In a data processing system having a computer with a storage device and that is connectable without rebooting to a first network of a first type and a second network of a second type, wherein the first network and the second network each store file system structures, a computer-readable medium holding computer-executable instructions for performing a method of providing access to one of the file system structures from one of the networks when the computer is disconnected from at least one of the networks, comprising the steps of:

when the computer is connected to the first network and a first program is running on the computer,
  (i) receiving a first request to access a selected one of the file system structures stored on the first network from the first program;
  (ii) in response to the first request, transparently obtaining a shadow copy of the selected file system structure relative to the first program;
  (iii) storing the shadow copy of the selected file system structure in a shadow database on the storage device which holds file system structures connected to the first network;

when the computer is subsequently connected to the second network and a second program is running on the computer,
  (i) receiving a second request to access a given one of the file system structures stored on the second network from the second program;
  (ii) in response to the second request, transparently obtaining a shadow copy of the given file system structure relative to the second program; and
  (iii) storing the shadow copy of the given file system structure in the shadow database on the storage device.

13. The computer-readable medium of claim 12 wherein the method further comprises the steps of:

when the computer is disconnected from the first network,
  (i) receiving a request to access the selected file system structure of the first network; and
  (ii) using the shadow copy of the selected file system structure that is stored in the shadow database to service the request.

14. The computer-readable medium of claim 13 wherein the method further comprises the step of flushing the shadow database to remove all file system structures for the first network when the computer is reconnected to the first network.

15. The computer-readable medium of claim 12 wherein the method further comprises the steps of:

before storing the shadow copy of the selected file system structure, determining that there is insufficient free space in the shadow database to store the shadow copy; and deleting file system structures in the shadow database to create sufficient free space to store the shadow copy of the selected file system structure.

16. The computer readable medium of claim 12 wherein the shadow database is a priority queue that stores file system structures according to priority of the file system structures and wherein the selected file system structure has a priority and said step of storing the shadow copy of the selected file system structure comprises the step of storing the shadow copy of the selected file system structure at a location in the priority queue based on the priority of the selected file system structure.

* * * * *